United States Patent
Zhou et al.

(10) Patent No.: US 12,500,463 B2
(45) Date of Patent: Dec. 16, 2025

(54) ROTOR ASSEMBLY AND ELECTRONIC WATER PUMP

(71) Applicant: ZHEJIANG DUNAN ARTIFICIAL ENVIRONMENT CO., LTD., Shaoxing (CN)

(72) Inventors: Xiaowei Zhou, Shaoxing (CN); Fugang Wang, Shaoxing (CN); Peiyu Cai, Shaoxing (CN); Junjie Wang, Shaoxing (CN)

(73) Assignee: ZHEJIANG DUNAN ARTIFICIAL ENVIRONMENT CO., LTD., Shaoxing (CN)

( * ) Notice: Subject to any disclaimer, the term of this patent is extended or adjusted under 35 U.S.C. 154(b) by 0 days.

(21) Appl. No.: 18/111,513

(22) Filed: Feb. 17, 2023

(65) Prior Publication Data
US 2023/0208227 A1    Jun. 29, 2023

Related U.S. Application Data

(63) Continuation of application No. PCT/CN2021/101962, filed on Jun. 24, 2021.

(30) Foreign Application Priority Data

Aug. 19, 2020 (CN) .......................... 202021747199.1

(51) Int. Cl.
*H02K 1/28* (2006.01)
*F04D 13/06* (2006.01)
(Continued)

(52) U.S. Cl.
CPC ........... *H02K 1/28* (2013.01); *F04D 13/0606* (2013.01); *F04D 29/026* (2013.01); *F04D 29/20* (2013.01);
(Continued)

(58) Field of Classification Search
CPC ...... H02K 1/28; H02K 1/276; F04D 13/0606; F04D 29/026; F04D 29/20;
(Continued)

(56) References Cited

U.S. PATENT DOCUMENTS 2,906,208 A * 9/1959 White ................. F04D 29/2222
417/357
3,192,861 A * 7/1965 Haegh ................... F04D 13/064
417/357
(Continued)

FOREIGN PATENT DOCUMENTS

CN    205001051 U    1/2016
CN    206932083 U    1/2018
(Continued)

OTHER PUBLICATIONS

European search report of EP21857345.9.
International Search Report of PCT/CN2021/101962.
Notice of Reasons for Refusal of JP2023504200.

*Primary Examiner* — David N Brandt

(57) ABSTRACT

A rotor assembly and an electronic water pump are provided, and the rotor assembly includes an impeller cover, an impeller base and a rotor. One end of the impeller base is connected to the impeller cover, an outer wall of the other end of the impeller base is provided with a ring-shaped mounting recess, and the rotor is mounted in the mounting recess. The rotor comprises a rotor iron core, a sleeve and at least two end plates, the rotor iron core is sleeved on an outside of the impeller base and located in the mounting recess, the sleeve is sleeved on an outside of the rotor iron core to seal the rotor iron core in the mounting recess, the at least two end plates are located on both ends of the rotor iron core, respectively. And the at least two end plates are connected to the sleeve.

18 Claims, 4 Drawing Sheets

(51) Int. Cl.
*F04D 29/00* (2006.01)
*F04D 29/02* (2006.01)
*F04D 29/20* (2006.01)
*F04D 29/22* (2006.01)
*F04D 29/60* (2006.01)
*F04D 29/62* (2006.01)
*H02K 1/276* (2022.01)

(52) U.S. Cl.
CPC ....... *F04D 29/2205* (2013.01); *F04D 29/628* (2013.01); *H02K 1/276* (2013.01); *F04D 29/007* (2013.01); *F04D 29/605* (2013.01)

(58) Field of Classification Search
CPC .. F04D 29/2205; F04D 29/628; F04D 29/007; F04D 29/605; F04D 13/064
See application file for complete search history.

(56) References Cited

U.S. PATENT DOCUMENTS

| | | | |
|---|---|---|---|
| 2020/0072224 A1 | 3/2020 | Zou et al. | |
| 2021/0048011 A1* | 2/2021 | Lin | F04D 13/0606 |
| 2022/0399768 A1* | 12/2022 | Aso | F04D 13/0633 |

FOREIGN PATENT DOCUMENTS

| | | |
|---|---|---|
| CN | 107676307 A | 2/2018 |
| CN | 207021790 U | 2/2018 |
| CN | 208904786 U | 5/2019 |
| CN | 210889358 U | 6/2020 |
| CN | 211116647 U | 7/2020 |
| CN | 213341784 U | 6/2021 |
| JP | 2000125523 A | 4/2000 |
| JP | 2009127450 A | 6/2009 |
| JP | 2015204734 A | 11/2015 |
| JP | 201725905 A | 2/2017 |
| JP | 201761924 A | 3/2017 |

* cited by examiner

ROTOR ASSEMBLY AND ELECTRONIC WATER PUMP

CROSS-REFERENCE TO RELATED APPLICATIONS

This application claims all benefits accruing from China Patent Application No. 202021747199.1, filed on Aug. 19, 2020, titled "ROTOR ASSEMBLY AND ELECTRONIC WATER PUMP" in the China National Intellectual Property Administration, which is hereby incorporated by reference.

TECHNICAL FIELD

The present disclosure relates to the field of rotors, and in particular, to a rotor assembly and an electronic water pump.

BACKGROUND

Generally, a rotor assembly includes a rotor iron core connected to an impeller base of the rotor assembly and a permanent magnet. When in use, the rotor assembly is immersed in a cooling liquid, and since the rotor iron core is usually made of silicon laminations, the rotor iron core can rust and corrode easily when directly exposed in the cooling liquid.

SUMMARY

For solving the above problem, it is necessary to provide a rotor assembly and an electronic water pump to avoid corrosion of a rotor iron core of the rotor assembly.

The present disclosure provides a rotor assembly, and the rotor assembly includes an impeller cover, an impeller base and a rotor. One end of the impeller base is connected to the impeller cover, an outer wall of the other end of the impeller base is provided with a ring-shaped mounting recess, and the rotor is mounted in the mounting recess. The rotor includes a rotor iron core, a sleeve and at least two end plates. The rotor iron core is sleeved on an outside of the impeller base and located in the mounting recess. The sleeve is sleeved on an outside of the rotor iron core to seal the rotor iron core in the mounting recess. The at least two end plates are located on both ends of the rotor iron core, respectively, and the at least two end plates are connected to the sleeve and partly in contact with an inner wall of the sleeve.

In some embodiments, the at least two end plates and the sleeve are both made of metal.

In some embodiments, the at least two end plates are connected to the sleeve by welding.

In some embodiments, each of the at least two end plates includes a cylinder-shaped portion and a ring-shaped portion and is L-shaped, the cylinder-shaped portion is connected to the sleeve and in contact with the inner wall of the sleeve, and the ring-shaped portion abuts against an end of the rotor iron core.

In some embodiments, the impeller cover and the impeller base are both made of plastic, and the impeller cover is connected to the impeller base by ultrasonic welding.

In some embodiments, the rotor further includes a plurality of permanent magnets, the rotor iron core is provided with a first mounting hole and a plurality of second mounting holes arranged around the first mounting hole. The rotor iron core is sleeved on the impeller base through the first mounting hole. The plurality of permanent magnets are disposed in the plurality of second mounting holes, respectively, and limited by the at least two end plates.

In some embodiments, a plurality of protrusions are provided on an inner wall of the first mounting hole, and the plurality of protrusions abut against the impeller base.

In some embodiments, an inner wall of one of the plurality of second mounting holes is provided with at least two limiting portions, and the at least two limiting portions abut against both sides of the permanent magnet and are configured for limiting the permanent magnet.

In some embodiments, the impeller base is provided with a mounting hole of a pump shaft, the mounting hole of the pump shaft is configured for accommodating and mounting the pump shaft, and the pump shaft is directly connected to the impeller base. The impeller base is further provided with an annular groove extending along an axial direction of the impeller base, and the annular groove is located outside the mounting hole of the pump shaft.

The present disclosure further provides an electronic water pump, and the electronic water pump includes the above rotor assembly.

The present disclosure provides a rotor assembly and an electronic water pump. In the rotor assembly, by providing the mounting recess on the impeller base, the rotor iron core can be mounted in the mounting recess. By providing the sleeve and the at least two end plates, the rotor iron core can be sealed in the mounting recess by the sleeve. Furthermore, the at least two end plates can be connected to the sleeve and partly in contact with an inner wall of the sleeve, so as to play a role of supporting the sleeve. Therefore, sealing effect of the mounting recess can be ensured by the at least two end plates in cooperation with the sleeve, thus prevent cooling liquid from entering the mounting recess, preventing the rotor iron core from being exposed in the cooling liquid, and preventing the rotor iron core from being corroded.

Figure 1:
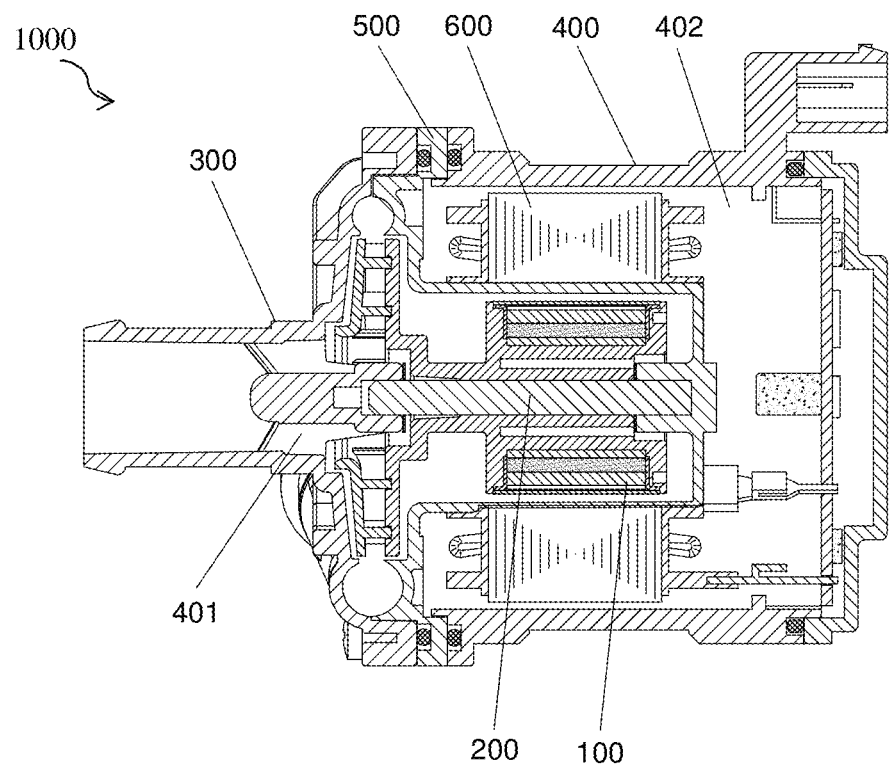
FIG. 1 is a schematic view of an electronic water pump in an embodiment of the present disclosure.
Figure 2:
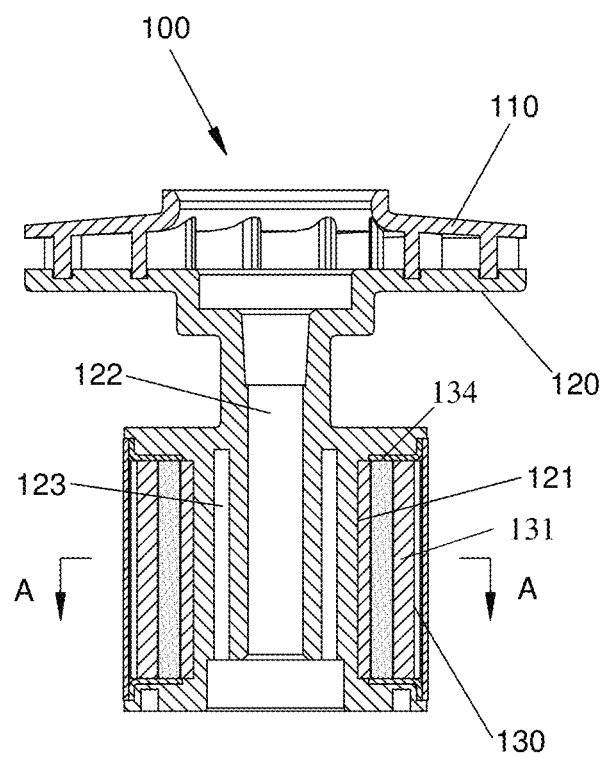
FIG. 2 is a schematic view of a rotor assembly in an embodiment of the present disclosure.
Figure 3:
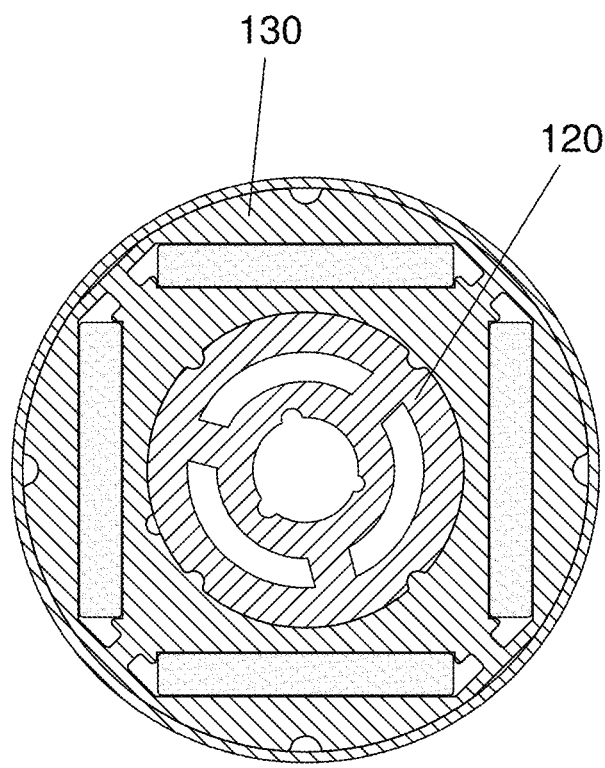
FIG. 3 is a sectional schematic view along a line A-A in FIG. 2.
Figure 4:
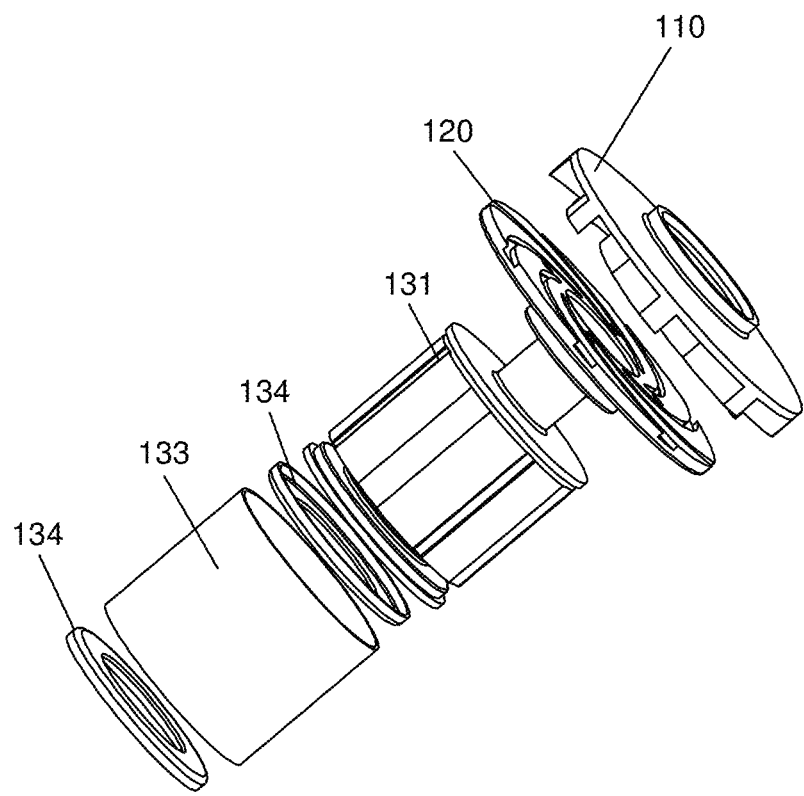
FIG. 4 is an exploded schematic view of a rotor assembly in an embodiment of the present disclosure.
Figure 5:
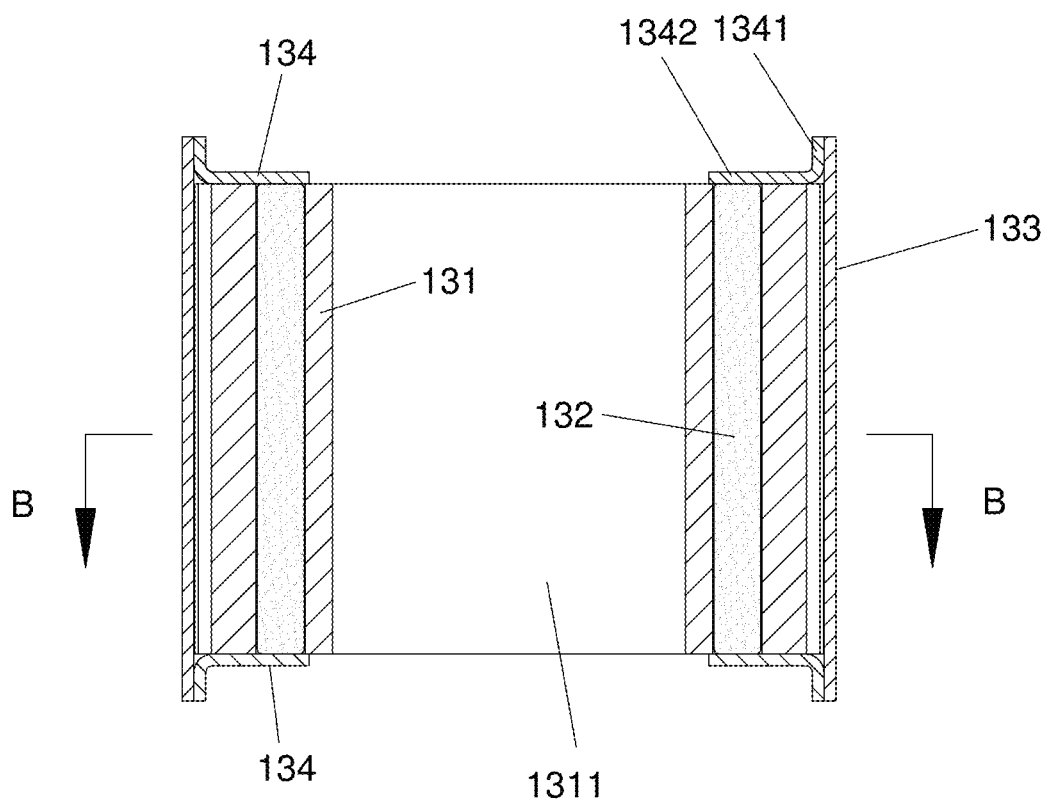
FIG. 5 is a sectional schematic view of a rotor of a rotor assembly in an embodiment of the present disclosure.

In the figure, 100 represents a rotor assembly, 110 represents an impeller cover, 120 represents an impeller base, 121 represents a mounting recess, 122 represents a mounting hole of the pump shaft, 123 represents an annular groove, 130 represents a rotor, 131 represents a rotor iron core, 1311 represents a first mounting hole, 1312 represents a second mounting hole, 1313 represents a protrusion, 1314 represents a limiting portion, 132 represents a permanent magnet, 133 represents a sleeve, 134 represents an end plate, 1341 represents a cylinder-shaped portion, 1342 represents a ring-shaped portion, 200 represents a pump shaft, 300 represents a pump head, 400 represents a pump housing, 401 represents a wet cavity, 402 represents a dry cavity, 500 represents an insulating sleeve, 600 represents a stator assembly, and 1000 represents an electronic water pump.

DETAILED DESCRIPTION

Hereinafter, the technical solutions in the embodiments of the present disclosure will be clearly and completely described with reference to the accompanying drawings in the embodiments of the present disclosure. Obviously, the described embodiments are merely a part of the embodiments of the present disclosure, rather than all of the embodiments. Based on the embodiments of the present disclosure, all other embodiments obtained by one skilled in the art without creative efforts all belong to the scope of protection of the present disclosure.

It should be noted that when an element is referred to as being "located" on another element, it may be directly located on the other element or a further element may be presented between them. When an element is referred to as being "disposed" on another element, it may be directly disposed on the other element or a further element may be presented between them. When an element is referred to as being "fixed" to another element, it may be directly fixed to the other element or a further element may be presented between them.

Unless otherwise defined, all technical and scientific terms used herein have the same meaning as one skilled in the art would understand. The terminology used in the description of the present disclosure is for the purpose of describing particular embodiments and is not intended to limit the disclosure. As used herein, the term "or/and" includes any and all combinations of one or more related listed items.

Referring to FIG. 2 to FIG. 7, the present disclosure provides a rotor assembly 100, and the rotor assembly 100 includes an impeller cover 110, an impeller base 120 and a rotor 130. One end of the impeller base 120 is connected to the impeller cover 110, an outer wall of the other end of the impeller base 120 is provided with a ring-shaped mounting recess 121 for mounting the rotor 130, and the rotor 130 is mounted in the mounting recess 121.

The rotor 130 includes a rotor iron core 131, a sleeve 133 and at least two end plates 134. The rotor iron core 131 is sleeved on an outside of the impeller base 120 and located in the mounting recess 121. The sleeve 133 is sleeved on an outside of the rotor iron core 131 to seal the rotor iron core 131 in the mounting recess 121. The at least two end plates 134 are located on both ends of the rotor iron core 131, respectively, and the at least two end plates 134 are connected to the sleeve 133 and partly in contact with an inner wall of the sleeve 133. The at least two end plates 134 can be provided to support the sleeve 133. Therefore, the sleeve 133 cannot easy to be deformed, sealing effect of the mounting recess 121 can be ensured by the at least two end plates 134 in cooperation with the sleeve 133, thus prevent cooling liquid from entering the mounting recess 121, and preventing the rotor iron core 131 from being corroded.

In the rotor assembly 100, by providing the mounting recess 121 on the impeller base 120, the rotor 130 can be mounted in the mounting recess 121. The rotor 130 can be provided with the sleeve 133, the rotor iron core 131 can be sealed in the mounting recess 121 by the sleeve 133. Furthermore, the at least two end plates 134 can be connected to the sleeve 133 and partly in contact with an inner wall of the sleeve 133, so as to play a role of supporting the sleeve 133. Therefore, sealing effect of the mounting recess 121 can be ensured by the at least two end plates 134 in cooperation with the sleeve 133, thus prevent cooling liquid from entering the mounting recess 121, preventing the rotor iron core 131 from being exposed in the cooling liquid, and preventing the rotor iron core 131 from being corroded.

Furthermore, the rotor 130 can further include a plurality of permanent magnets 132, and the rotor iron core 131 can be provided with a first mounting hole 1311 and a plurality of second mounting holes 1312 arranged around the first mounting hole 1311. The rotor iron core 131 can be sleeved on the impeller base 120 through the first mounting hole 1311. The permanent magnet 132 can be disposed in the plurality of second mounting holes 1312 and limited by the at least two end plates 134. Since the plurality of permanent magnets 132 are disposed in the plurality of second mounting holes 1312 of the rotor iron core 131, respectively, both the rotor iron core 131 and the plurality of permanent magnets 132 can be sealed in the mounting recess 121 by the sleeve 133. Therefore, the plurality of permanent magnets 132 can be prevented from being exposed in the cooling liquid and being corroded. The plurality of permanent magnets 132 can be limited by the at least two end plates 134, thus preventing the plurality of permanent magnets 132 from falling out of the plurality of second mounting holes 1312 during an assembly process, which facilitates the assembly of the rotor 130.

In the present embodiment, the sleeve 133 can be ring-shaped, and a cross section of the sleeve 133 can be circular-shaped. The at least two end plates 134 are connected to the sleeve 133 and partly in contact with an inner wall of the sleeve 133, so that roundness of the sleeve 133 can be ensured, and the sleeve 133 cannot easy to be deformed.

In the present embodiment, the impeller cover 110 and the impeller base 120 can be both made of plastic, and the impeller cover 110 can be connected to the impeller base 120 by ultrasonic welding. Furthermore, the impeller base 120 can be made of plastic such as wearable Polyphenylene sulfide (PPS), which contributes to prolonging service life. During the assembly process, the rotor 130 as an insert member can be injection-moulded with the impeller base 120 into a whole, which contributes to simplifying a structure of the rotor assembly and simplifying assembly steps.

The impeller base 120 can be provided with a mounting hole 122 of the pump shaft, the mounting hole 122 of the pump shaft can be configured for accommodating and mounting the pump shaft 200. In an electronic water pump 1000, the pump shaft 200 can be inserted into the mounting hole 122 of the pump shaft, and the rotor assembly 100 can rotate around the pump shaft 200. Furthermore, the pump shaft 200 can be directly connected to the impeller base 120, that is, no bearings can be provided between the pump shaft 200 and the impeller base 120, which contributes to simplifying an overall structure of the electronic water pump 1000.

The impeller base 120 can be further provided with an annular groove 123 extending along an axial direction of the impeller base 120, and the annular groove 123 can be located outside the mounting hole 122 of the pump shaft. In this way, the annular groove 123 can be provided to form a partially hollow-out structure in the impeller base 120, thus saving material, reducing costs and weight of the impeller base 120.

In some embodiments, the at least two end plates 134 and the sleeve 133 can be both made of metal, and the metal sleeve has high structural strength and long service life. Moreover, compared with the plastic formed by injection molding, production processes of the sleeve 133 and the at least two end plates 134 can be simpler, which contributes to reducing a gap between the rotor iron core 131 and a stator assembly, and contribute to avoiding problems of magnetic leakage and improving performance of the rotor assembly 100.

In some embodiments, the at least two end plates 134 can be connected to the sleeve 133 by welding, so as to achieve high connection strength and good sealing performance, which can prevent the cooling liquid from entering the mounting recess 121 and corroding the rotor iron core 131 and the permanent magnet 132. Furthermore, the at least two end plates 134 and the sleeve 133 can be made of stainless steel, which is inexpensive and less prone to rust, thus well protecting the rotor iron core 131 and permanent magnet 132.

In the present embodiment, each of the at least two end plates 134 can include a cylinder-shaped portion 1341 and a ring-shaped portion 1342 and can be L-shaped, the cylinder-shaped portion 1341 can be connected to the sleeve 133 and in contact with the inner wall of the sleeve 133, and the ring-shaped portion 1342 can abut against an end of the rotor iron core 131. The end plate 134 can be simple in structure, in which the ring-shaped portion 1342 can abut against an end of the rotor iron core 131 and the cylinder-shaped portion 1341 can be connected to the sleeve 133 and in contact with the inner wall of the sleeve 133. Therefore, a structurally stable and integrative structure can be formed by the rotor iron core 131, the plurality of permanent magnets 132 and the at least two end plates 134. During assembly, the plurality of permanent magnets 132 can be disposed into the plurality of second mounting holes of the rotor iron core 131, respectively. Then the sleeve 133 can be sleeved on an outside of the rotor iron core 131, and the at least two end plates 134 can be mounted on both ends of the rotor iron core 131, respectively, so that the ring-shaped portion 1342 can abut against the end of the rotor iron core 131. The cylinder-shaped portion 1341 of the end plate 134 can then be connected to the sleeve 133 by welding, so that the rotor 130 can be assembled. After that, the rotor 130 as an insert member can be injection-moulded with the impeller base 120 into a whole. Finally, the impeller base 120 can be connected to the impeller cover 110 by ultrasonic welding to form the rotor assembly 100.

As mentioned above, the rotor iron core 131 can be sleeved on the impeller base 120 through the first mounting hole 1311. To improve structural strength between the rotor iron core 131 and the impeller base 120, a plurality of protrusions 1313 can be provided on an inner wall of the first mounting hole 1311, and the plurality of protrusions 1313 can abut against the impeller base 120. The plurality of protrusions 1313 can be provided to improve the structural strength between the rotor core 131 and the impeller base 120, preventing the rotor 130 from rotating relative to the impeller base 120. In addition, the plurality of protrusions 1313 can be evenly distributed along a circumference direction of the first mounting hole 1311.

An inner wall of one of the plurality of second mounting holes 1312 can be provided with at least two limiting portions 1314, and the at least two limiting portions 1314 can abut against both sides of the permanent magnet 132 and can be configured for limiting the permanent magnet 132. In this way, by providing the at least two limiting portions 1314, the permanent magnet 132 can be prevented from moving within the second mounting hole 1312.

Figure 6:
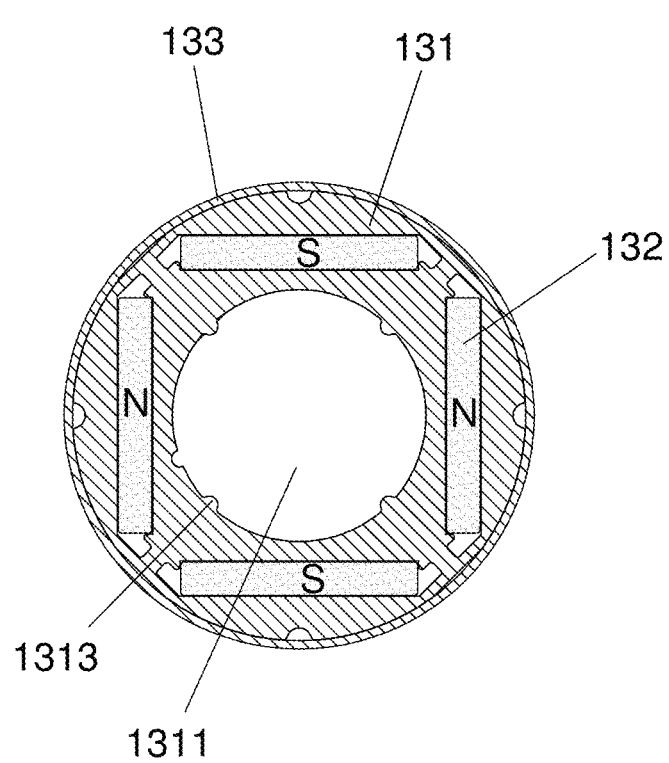
FIG. 6 is a sectional schematic view along a line B-B in FIG. 5.
Figure 7:
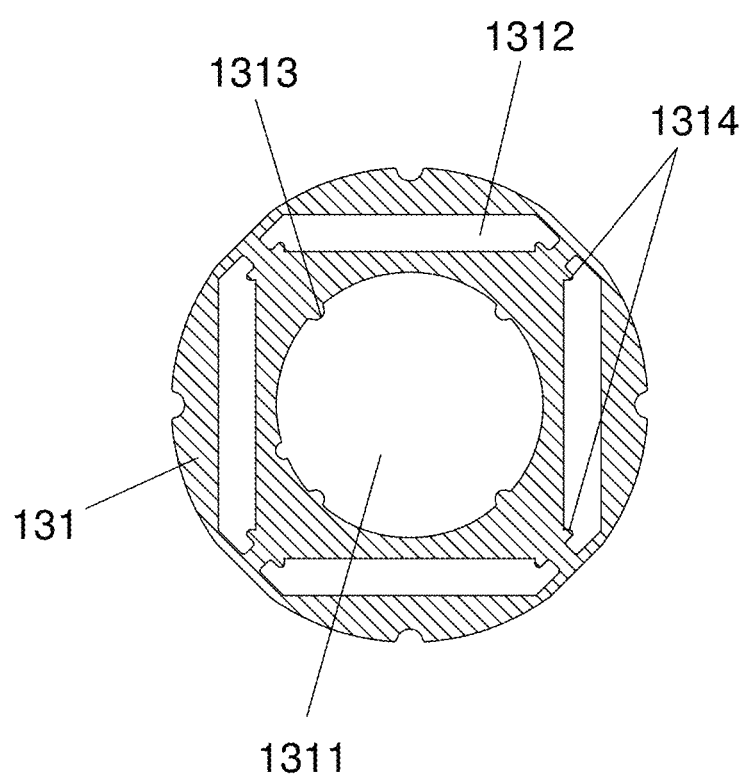
FIG. 7 is a sectional schematic view of a rotor iron core of a rotor assembly in an embodiment of the present disclosure.

The plurality of permanent magnets 132 can be disposed in the corresponding plurality of second mounting holes 1312, respectively. Referring to FIG. 6, the N pole and S pole of the plurality of permanent magnets 132 can be disposed crossingly.

Referring to FIG. 1, the present disclosure further provides an electronic water pump 1000, and the electronic water pump 1000 includes the rotor assembly 100 as described in any one of the above embodiments. The electronic water pump 1000 can further include a pump head 300, a pump housing 400, an insulating sleeve 500, and a stator assembly 600. The pump head 300 can be connected to an end of the pump housing 400, and an inner cavity can be defined by the pump head 300 cooperated with the pump housing 400. The insulating sleeve 500 can be disposed between the pump head 300 and the pump housing 400 and divide the inner cavity into a dry cavity 402 and a wet cavity 401. The rotor assembly 100 can be mounted in the wet cavity 401 via the pump shaft 200, and the rotor assembly 100 can rotate around the pump shaft 200. And the stator assembly 600 can be disposed in the dry cavity 402.

The technical features of the above-described embodiments may be combined in any combination. For the sake of brevity of description, not all possible combinations of the technical features in the above embodiments are described. However, as long as there is no contradiction between the combinations of these technical features, all should be considered as within the scope of this disclosure.

A person of ordinary skill in the art should realize that the above embodiments are merely used to illustrate the present disclosure, and are not intended to limit the present disclosure, without departing from the spirit and scope of the disclosure, variations and modifications based on the above embodiments fall within the scope of the present disclosure.

We claim:

1. A rotor assembly, comprising an impeller cover, an impeller base and a rotor,
    wherein one end of the impeller base is connected to the impeller cover, an outer wall of another end of the impeller base is provided with a ring-shaped mounting recess, and the rotor is mounted in the mounting recess, and
    the rotor comprises a rotor iron core, a sleeve and at least two end plates, the rotor iron core is sleeved on an outside of the impeller base and located in the mounting recess, the sleeve is sleeved on an outside of the rotor iron core to seal the rotor iron core in the mounting recess, the at least two end plates are located on opposing ends of the rotor iron core, respectively, and the at least two end plates are connected to the sleeve and partly in contact with an inner wall of the sleeve,
    wherein the at least two end plates are separated from each other, each of the at least two end plates comprises a cylinder-shaped portion and a ring-shaped portion, the at least two end plates are each L-shaped, the cylinder-shaped portion is connected to the sleeve and in contact with the inner wall of the sleeve, the ring-shaped portion abuts against and is in contact with an end of the opposing ends of the rotor iron core; and
    ends of the sleeve along an axial direction of the impeller base are covered by the impeller base,
    each of the at least two end plates is axially covered by the impeller base, each of the at least two end plates having a surface facing away from the rotor iron core in the axial direction, and each of the surfaces are in contact with the impeller base.

2. The rotor assembly of claim 1, wherein the at least two end plates and the sleeve are each made of metal.

3. The rotor assembly of claim 1, wherein the at least two end plates are connected to the sleeve by welding.

4. The rotor assembly of claim 1, wherein the impeller cover and the impeller base are both made of plastic, and the impeller cover is connected to the impeller base by ultrasonic welding.

5. The rotor assembly of claim 1, wherein the rotor further comprises a plurality of permanent magnets, the rotor iron core is provided with a first mounting hole and a plurality of second mounting holes arranged around the first mounting hole, the rotor iron core is sleeved on the impeller base via the first mounting hole, and the plurality of permanent magnets are disposed in the plurality of second mounting holes, respectively, and limited by the at least two end plates.

6. The rotor assembly of claim 5, wherein a plurality of protrusions are provided on an inner wall of the first mounting hole, and the plurality of protrusions abut against the impeller base.

7. The rotor assembly of claim 6, wherein the plurality of protrusions are evenly distributed along a circumference direction of the first mounting hole.

8. The rotor assembly of claim 5, wherein an inner wall of each of the plurality of second mounting holes is provided with at least two limiting portions, and the at least two limiting portions abut against opposing sides of each permanent magnet of the plurality of permanent magnets and are configured for limiting each permanent magnet.

9. The rotor assembly of claim 1, wherein the impeller base is provided with a mounting hole of a pump shaft, the mounting hole of the pump shaft is configured for accommodating and mounting the pump shaft, and the pump shaft is directly connected to the impeller base; and the impeller base is further provided with an annular groove extending along the axial direction of the impeller base, and the annular groove is located outside the mounting hole of the pump shaft.

10. The rotor assembly of claim 1, wherein the sleeve is ring-shaped, and a cross section of the sleeve is circular-shaped.

11. An electronic water pump, comprising the rotor assembly of claim 1.

12. The electronic water pump of claim 11, wherein the at least two end plates and the sleeve are each made of metal.

13. The electronic water pump of claim 11, wherein the at least two end plates are connected to the sleeve by welding.

14. The electronic water pump of claim 11, wherein the impeller cover and the impeller base are both made of plastic, and the impeller cover is connected to the impeller base by ultrasonic welding.

15. The electronic water pump of claim 11, wherein the rotor further comprises a plurality of permanent magnets, the rotor iron core is provided with a first mounting hole and a plurality of second mounting holes arranged around the first mounting hole, the rotor iron core is sleeved on the impeller base via the first mounting hole, and the plurality of permanent magnets are disposed in the plurality of second mounting holes, respectively, and limited by the at least two end plates.

16. The electronic water pump of claim 15, wherein a plurality of protrusions are provided on an inner wall of the first mounting hole, and the plurality of protrusions abut against the impeller base.

17. The electronic water pump of claim 15, wherein an inner wall of each of the plurality of second mounting holes is provided with at least two limiting portions, and the at least two limiting portions abut against opposing sides of each permanent magnet of the plurality of permanent magnets and are configured for limiting each permanent magnet.

18. The electronic water pump of claim 11, wherein the impeller base is provided with a mounting hole of a pump shaft, the mounting hole of the pump shaft is configured for accommodating and mounting the pump shaft, and the pump shaft is directly connected to the impeller base; and the impeller base is further provided with an annular groove extending along the axial direction of the impeller base, and the annular groove is located outside the mounting hole of the pump shaft.

* * * * *